Patented May 22, 1951

2,554,479

UNITED STATES PATENT OFFICE 2,554,479

PROTEIN MODIFICATION

Hans Wolff, Decatur, Ill., assignor to A. E. Staley Manufacturing Company, Decatur, Ill., a corporation of Delaware No Drawing. Application April 6, 1948,
Serial No. 19,442

5 Claims. (Cl. 260—112)

This invention pertains to a process for the treatment of protein or proteinaceous material with alkali in an oxygen-rich atmosphere. More particularly, it pertains to such treatments wherein the oxygen gas concentration is above that found in the air.

The principal object of the invention is to provide a modified protein product of improved properties such as lighter color and superior odor and flavor.

The absence of odor in the product suggests that no sulfide linkages have been broken. Accordingly, it is another object of the invention to provide a modified protein for industrial uses wherein this feature may be significant, as in the coating field.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the application of which will be indicated in the claims.

Modified proteins prepared in accordance with the teachings of the present invention are particularly desirable when used for food, pharmaceutical and industrial purposes. For example, considerable improvement in color, odor and flavor characteristics accompanying its use as a whipping protein, and the product is far superior when compared with conventional alkali modified proteins similarly used.

Proteins are complex organic compounds found in plant and animal matter, and, as the name proteios (primary) given to them indicates, they are substances of great importance. In composition, they are distinguished from carbohydrates and fats by the presence of nitrogen and frequently other elements such as sulfur and phosphorous. Their complexity is evidenced by their colloidal nature, the variety of their reactions and their decomposition products. Confirmation is found in their molecular weights, which range upward from about 15,000. They are considered to be multiples of simpler building blocks or units called amino acids, of which about 20 are known, which allows for great variety and complexity in structure and composition. Modification of these compounds by alkaline treatment, as in the instant invention, may result in many changes. These might include diminution or degradation in size of the molecule, yielding proteoses and peptones. Amino groups and peptide linkages may be attacked in this degradation, depending upon the conditions employed.

In practising the invention, a protein or proteinaceous material such as gluten or seed-meal, a proper amount of an alkali and sufficient water are mixed together to give a slurry of the desired fluidity. This will depend on the method selected to contact the alkaline slurry with oxygen during the reaction. For example, the slurry may be pumped or flowed through a vessel containing the oxygen gas, or the reverse of this, wherein the oxygen gas is the fluid being pumped or flowed. Various other techniques may be used if desired, such as bubbling devices and shakers, including pressure vessels.

Means should be provided for heating the slurry during the reaction, the optimum temperature range for most purposes having been found to be about 50–100° C. At temperatures below 50° C., modification is extremely slow and impractical. The temperature and time of reaction are interdependent variables, and are influenced also by the degree of modification desired in the final product.

Alkaline materials in general are suitable for dispersing the protein material in water, including the alkali and alkaline-earth oxides and hydroxides and also their salts of weak acids sufficiently soluble and basic enough to disperse proteins.

Proteinaceous materials which have been treated in accordance with the present invention include soybean meal, flakes and extracted protein; corn gluten and zein; peanut protein; cottonseed meal; casein.

Specific examples of alkali modification in the presence of oxygen as applied to soybean material, corn gluten, peanut protein, cottonseed meal, and casein are as follows:

Example 1

A suspension of 100 g. of solvent extracted soya flakes (containing 51 per cent of protein calculated by multiplying the nitrogen content with the factor of 6.25) in 700 ml. of water and 45 ml. of 2 n sodium hydroxide was heated for 30 minutes to 97–99° C. under 40 pounds of oxygen pressure. A control run to which no oxygen was added was also carried out. The filtrate of the oxygen treated run had a pH of 9.8, the control 10.3. Both runs were acidified to a pH of 4.3; the non-oxygen treated run emitted disagreeable sulfide-like odors, but the oxygen treated run had none of these characteristics and was also lighter in color. This latter observation can also be used to advantage in bleaching the modified proteins since less bleaching agent is required to obtain a light yellow dispersion on the oxygen treated runs compared to the ones carried out without excess oxygen. The yield of air dried modified protein was 38 g.

*Example 2*

A suspension of 100 g. of solvent extracted soya flakes in 700 ml. of water and 50 ml. of 2 n sodium hydroxide was treated under stirring for two hours at 70–71° C. while a lively stream of oxygen was introduced below the liquid. The warm solution was filtered. The pH of the oxygen treated material was 10.4, the untreated 10.6. Color and odor properties were similar to the run described in Example 1. If 45 ml. of 2 n sodium hydroxide is used and the reaction is carried out for 30 minutes at 99–100° C., similar results are obtained.

*Example 3*

To 34 g. of corn gluten (70 per cent protein) in suspension in 350 ml. of water, 25 ml. of 2 n sodium hydroxide was added; this mixture had a pH of 11.9. Half of this mixture was treated for one hour at 98° C. (under 8 pounds oxygen pressure, the other half under 8 pounds nitrogen pressure at the same temperature). The pH of the oxygen treated sample dropped to 9.7 and of the nitrogen sample to 10.3. The oxygen treated mixture was of a yellow tan color; the nitrogen treated mixture was a green-black. Upon acidification a very pronounced sulfide odor was observed in the nitrogen treated sample; none in the oxygen one.

*Example 4*

A suspension of 25 g. of peanut protein (92.8 per cent protein) in 150 cc. of water and 22.5 cc. of 2 n sodium hydroxide was treated for one hour at 98° C. under oxygen at 8 pounds pressure and a similar sample in a closed air filled container. Here, too, a decided improvement in color and odor is noticed in the oxygen treated batch.

*Example 5*

Cottonseed meal (21 g.) of 58.3 per cent of protein content was dispersed in 175 ml. of water and 20 ml. of 2 n sodium hydroxide. One sample was treated under 8 pounds of oxygen, and one under 8 pounds of nitrogen pressure, each at 98° C. for one hour. The color difference was not very great, but the difference in sulfide odor on acidification was very pronounced. The oxygen treated sample had very little smell; the other one had a strong disagreeable odor.

*Example 6*

A sample of 25 g. of commercial casein in 150 ml. of water and 22.5 ml. of 2 n sodium hydroxide was treated for 75 minutes under 8 pounds of oxygen pressure, and an identical sample was heated in a closed container in the presence of air for the same time. The sample treated without excess oxygen had a strong ammoniacal odor; the oxygen treated sample had very little odor. The color of the oxygen treated sample was considerably lighter. On acidification very little sulfide odor was observed in either run.

When the term "proteinaceous material" is used, it is meant to comprehend not only various proteins but also protein-rich materials such as seed meal, solvent extracted soybean flakes, etc.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. The process of modifying protein which consists of treating protein with aqueous alkaline reagent in an atmosphere containing oxygen gas in a percentage concentration substantially greater than in air.

2. The process of modifying protein which consists of treating protein with aqueous alkaline reagent while passing a gas containing elemental oxygen substantially in excess of 21% by volume through the reaction zone.

3. The process of modifying protein which consists of treating protein with aqueous alkaline reagent while maintaining the reaction mixture under superatmospheric pressure with a gas containing elemental oxygen substantially in excess of 21% by volume.

4. The process of modifying protein which consists of treating protein with aqueous alkaline reagent in an atmosphere containing oxygen gas in a concentration greater than in air, at a temperature of 50 to 100° C.

5. In the process of modifying protein to produce an improved whipping protein, the improvement consisting of heating an aqueous suspension of the protein having a pH substantially above 10, at a temperature in the range of 50 to 100° C., in an atmosphere containing oxygen gas in a percentage concentration substantially greater than in air.

HANS WOLFF.

REFERENCES CITED

The following references are of record in the file of this patent:

UNITED STATES PATENTS

| Number | Name | Date |
|---|---|---|
| 1,163,438 | Muller | Dec. 7, 1915 |
| 2,189,481 | Traill | Feb. 6, 1940 |
| 2,271,620 | Brier et al. | Feb. 3, 1942 |
| 2,409,475 | Cline et al. | Oct. 15, 1946 |
| 2,424,408 | McGeoch | July 22, 1947 |
| 2,478,065 | Turner et al. | Aug. 2, 1949 |